United States Patent Office 3,234,302

Patented Feb. 8, 1966

1

3,234,302

POLYMERIZATION OF BUTADIENE, STYRENE AND ACRYLONITRILE WITH BUTADIENE-STYRENE COPOLYMER

Donald M. Wacome, Bedford, Mass., assignor to W. R. Grace & Co., Cambridge, Mass., a corporation of Connecticut No Drawing. Filed Oct. 22, 1963, Ser. No. 318,116
11 Claims. (Cl. 260—880)

This application is a continuation-in-part of the copending application Serial No. 9,170, now abandoned, filed February 17, 1960, entitled, Solvent-Resistant Terpolymer.

This invention relates to polymers having a high degree of resistance to attack by organic solvents and by the oils and greases contained in foodstuffs. More particularly it relates to a process of emulsion polymerization by which solvent-resistant polymers may be made.

Among the solvent- and oil-resistant rubbers in most common use today are the copolymers of butadiene and acrylonitrile. These rubbers ordinarily contain from 25–40% of acrylonitrile, 35 and even 38% being necessary to achieve a high degree of solvent-resistance. While the butadiene-acrylonitrile rubbers, which are commonly referred to as "Buna-N" rubbers, are highly effective for many applications, the relatively large amount of acrylonitrile which they contain makes them so expensive that their use is often prohibited. In many applications, furthermore, and particularly in the manufacture of sealing gaskets for food containers, the unpleasant odor of high-acrylonitrile rubbers severely limits their use.

It is an object of my invention, therefore, to provide rubbery polymers having solvent- and oil-resistance equal to or even greater than the high-acrylonitrile Buna-N rubbers, but with a much lower acrylonitrile content. A further object of my invention is to provide oil- and solvent-resistant polymers having good film-forming characteristics, low odor, and generally acceptable properties for use in container sealing gaskets and as coating and impregnating materials. A still further object is to provide relatively inexpensive oil- and solvent-resistant polymers. Finally, my invention has for its object the development of an emulsion polymerization process by which the new polymers may be manufactured.

I have discovered that a new type of solvent- and oil-resistant polymer may be made by the emulsion polymerization of a mixture of butadiene, styrene and acrylonitrile in the presence of a completely finished butadiene-styrene copolymer latex, with the addition of fresh catalyst and fresh emulsifying agent. The polymer so formed is characterized by a high degree of resistance to solvents, oils and grease, even at a very low acrylonitrile content.

I believe that the polymers formed by the process of my invention are extremely complex in structure. While I do not fully understand this structure, I believe that the polymers so formed are in part graft copolymers and in part simple, ungrafted copolymers and homopolymers. The unexpected and very useful characteristics of the new polymers namely their high degree of solvent-resistance at low acrylonitrile content together with their excellent film-forming properties, are believed to be due in part to their complex structure and in part to the proportions of monomers and of butadiene-styrene copolymer latex used in their preparation.

My invention will be more completely understood by reference to the following examples, in which all parts and percentages are understood to be by weight.

EXAMPLE I

An aqueous phase was made by dissolving 3 parts of the sodium salt of disproportionated rosin acid, 2 parts of

2 the sodium salt of the condensation product of napthalene sulfonic acid with formaldehyde, 0.1 part of sodium hydroxide, 0.5 part of tertiary dodecyl mercaptan and 0.5 part of potassium persulfate in 205 parts of water. This solution was thoroughly mixed with 52.6 parts of a completely finished latex of a 15% 1,3-butadiene-85% styrene copolymer (38% solids) and 0.7 part of a 28% solution of ammonium hydroxide and the whole was transferred to a beer bottle which was used as a pressure vessel for the polymerization reaction.

The total solids in the latex was 52.6 parts×38% solids or 20 parts. 5 parts of emulsifier (3 parts of the sodium salt of disproportionated rosin acid and 2 parts of the sodium salt of the condensation product of naphthalene sulfonic acid with formaldehyde) were therefore used with 20 parts total solids, or in other words, 25 parts of emulsifier per 100 parts total solids.

Butadiene was poured into the bottle, and was then flashed off to purge the headspace of air, after which 20 parts of styrene and 20 parts of acrylonitrile were introduced into the bottle. 60 parts of 1,3-butadiene were then added, the bottle was capped and was placed in a rotating basket immersed in a water bath at 50° C.

Reaction was continued at this temperature for about 16 hours, i.e. until polymerization was about 90% completed, after which the bottle was cooled and opened and the latex removed for testing. The theoretical composition of the resulting polymer was a follows: butadiene 52.5%, styrene 31%, acrylonitrile 16.5%.

EXAMPLE II

The procedure of Example I was followed, with the substitution of a monomeric mixture consisting of 52.5 parts of butadiene, 17.5 parts of styrene and 30 parts of acrylonitrile. The composition of the resulting polymer was: butadiene 46.25%, styrene 28.75%, acrylonitrile 25%.

EXAMPLE III

The procedure of Example I was followed, except that 105 parts of the base latex were used. The total solids in the latex was 105 parts×38% solids or 40 parts. 5 parts of emulsifier (3 parts of the sodium salt of disproportionated rosin acid and 2 parts of the sodium salt of the condensation product of naphthalene sulfonic acid with formaldehyde) were therefore used with 40 parts total solids, or in other words, 12 parts of emulsifier per 100 parts total solids. The composition of the resulting polymer was: butadiene 47%, styrene 38.5%, acrylonitrile 14.5%.

EXAMPLE IV

The procedure of Example I was followed except that no base latex was used and the monomeric mixture contained 52.5 parts of butadiene, 31 parts of styrene and 16.5 parts of acrylonitrile. The composition of the polymer was the same as that of Example I.

The characteristics of the polymers made by the process of Examples I–IV were determined by the following procedure. The latices were coagulated with aluminum sulfate. The solid polymers so obtained were washed, dried and made into platens, and rectangular strips 2.5 x 0.31 x 0.05 inches were stamped out of the platens. In order to test the solvent-resistance of the polymers weighed strips of each polymer were immersed in solvent at 20° C. for a period of 72 hours and then dried and reweighed. The degree of attack by a given solvent was measured by the loss of weight of the strip expressed as percent of the original weight of the strip. For purposes of comparison, similar tests were made on butadiene-acrylonitrile copolymer rubbers containing 31 and 38 percent acrylonitrile. The tensile strength and elongation at break of the dried films were also measured. The results of these tests are recorded in Table I.

*Table I*

| Polymer Example No. | Percent weight loss in solvent | | | Tensile strength (lbs./sq. in.) | Elongation at break (percent) | Percent acrylonitrile |
|---|---|---|---|---|---|---|
| | Methylene chloride | Methyl ethyl ketone | Benzene | | | |
| I | 28 | 28.6 | 23.8 | 539 | 377 | 16.5 |
| II | 17.4 | 16.5 | 14.8 | 733 | 354 | 25.0 |
| III | 26.5 | 25.5 | 21.5 | 404 | 142 | 14.5 |
| IV | 43.5 | 44.3 | 35.3 | 145 | ---- | 16.5 |
| Butadiene-acrylonitrile copolymer | 40.5 | 36 | 23 | 38 | ---- | 31 |
| Do | 41 | 28.5 | 36 | 506 | 450 | 38 |

It will be seen from Table I that the solvent-resistance of the polymer of Example I, which contains only 16.5% of acrylonitrile is equal to and in many cases better than that of the butadiene-acrylonitrile copolymers tested, which contained about twice as much acrylonitrile. The polymer of Example II, with a somewhat higher proportion of acrylonitrile than the polymer of Example I, was even more solvent-resistant. The film-forming characteristics of the polymers of Examples I–III were found to be excellent. Table I also shows that the new polymers of my invention compared favorably with the butadiene-acrylonitrile copolymers in tensile strength and elongation at break.

The polymer of Example IV was made for the purpose of demonstrating the function of the finished copolymer latex in the new polymers of my invention. No copolymer latex was present during the polymerization of the monomers of Example IV. The resulting polymer, although it had the same overall composition as the polymer of Example I, was strongly attacked by solvents. Only when the acrylonitrile content of a polymer made in the absence of a base latex was increased to 25%, did the solvent-resistance of the polymer increase to a level comparable with that of the polymer made by the process of Example I.

As I have stated above, I believe that the unique properties of the new polymers of my invention are due in large part to the complex structure of the polymers, and in particular to the fact that at least a portion of the added monomers becomes attached to the base polymer by means of graft polymerization. This belief is borne out by the differences noted in Table I between the polymers of Examples I and IV, which have the same overall percentage composition but differ in the method of their preparation.

The butadiene-styrene copolymer latex used as the "base" latex must have been completely finished before it is used in the emulsion polymerization. By a "completely finished" latex, I mean an emulsion copolymer of butadiene and styrene in which the polymerization has been completed, the catalyst has been exhausted, and from which any remaining unconverted monomers have been removed by stripping. It is believed that a latex in this condition is completely devoid of free radicals and consequently presents, at the time of its introduction into the aqueous phase of the polymerization system, no active sites for graft polymerization. Such latices are frequently referred to in the literature as "dead."

It is essential, also, in carrying out the process of my invention that both emulsifying agent and catalyst are added to the new polymerization system. The mixture of finished latex, emulsifying agent, catalyst and fresh monomers apparently undergoes a complex set of reactions, in which some graft polymerization, some homopolymerization, some copolymerization involving two or three of the added monomers and some cross-linking between the chains grafted to the base polymer, occur. The resulting complex polymer possesses unique properties. It is resistant to attack by solvents, oils and greases to a far greater extent than is either the base polymer or the ungrafted terpolymer of Example IV. To demonstrate still further the unique character of the grafted terpolymers of my invention, a physical mixture of the base latex with an ungrafted terpolymer of butadiene, styrene and acrylonitrile was made. The proportions of the various constituents of the mixture were identical with those of Example I. The solvent-resistance of the polymer mixture, however, was very poor, falling as would be expected, between the solvent-resistance of the base polymer and that of the ungrafted terpolymer of Example IV.

The process of my invention may be varied to some extent provided it includes the essential steps of using a finished butadiene-styrene latex, adding emulsifying agent and catalyst, and polymerizing a mixture of butadiene, styrene and acrylonitrile in the presence of the copolymer latex until 90–100% of the monomers has been polymerized. For example, the catalyst, which may be sodium, potassium or ammonium persulfate, hydrogen peroxide, sodium perborate or any other water-soluble peroxygen compound may be added to the aqueous phase either before or after the addition of the copolymer latex, or it may be added to the polymerization mixture after the monomers have been added. According to a preferred form of the process, the catalyst is added to the aqueous phase, i.e. to the water and emulsifying agent, before the base latex is added. The emulsifying agent may be any one of the large number of soaps and other surface active materials which are commonly used in the emulsion polymerization of vinyl-type monomers. Thus, for example, sodium stearate, sodium oleate, lauryl sodium sulfate, soaps of rosin acids and the like may be used. Likewise, the temperature of polymerization may be varied somewhat if desired, the choice of a suitable polymerization temperature of this type of system being well within the ordinary skill of the art. The mixture may be heated either before the latex is added, after addition of the latex, or if desired after the monomers are in the reactor. I have found that very desirable and reproducible results are obtained by heating the mixture of aqueous phase, catalyst and copolymer latex prior to the introduction of the monomeric mixture. This procedure, therefore, constitutes a preferred form of my invention.

A modifier or chain-transfer agent is ordinarily added to the polymerization mixture to modify the hardness of the polymer, in accordance with the usual practice in emulsion polymerization of butadiene-styrene rubbers. The modifier may be any one of the materials ordinarily used for this purpose, for example tertiary dodecyl mercaptan, n-dodecyl mercaptan, n-hexyl mercaptan, n-tetradecyl mercaptan or any other primary or tertiary mercaptan having at least 6 and up to about 18 carbon atoms. It may be added to the aqueous phase if desired, but I have found that a more easily controlled and reproducible reaction results if the modifier is added to the polymerization mixture at the time the monomers are added.

I have found it advisable, furthermore, to terminate the reaction when the desired degree of conversion has been reached, by the addition of any of the well-known short-stop agents such as for example hydroquinone, hydrazine, sodium sulfite or any other suitable reducing agent, and to remove unreacted monomers from the polymerization mixture by stripping. The use of modifiers and short-stop agents and the step of stripping are all, like the choice of emulsifying agent and polymerization temperature, within the skill of those acquainted with the art of emulsion polymerization and do not form a part of the present invention.

The unique properties of the polymers of my invention are dependent, as stated above, partly on the process of their manufacture and partly on the proportions of the various constituents of the polymers.

I have found that acrylonitrile must constitute at least about 10% by weight of the total composition of the new polymers in order to obtain the desired solvent- and oil-resistance. Polymers containing less than this proportion of acrylonitrile have been found to be subject to attack by common solvents, oils and greases, while the resistance of the polymers to such attack increases dramatically at about the 10% level. Maximum resistance is obtained between about 15% and about 25% acrylonitrile. Polymers containing more than 25% acrylonitrile may also be made, although in general it is desirable to keep the level of acrylonitrile as low as possible in order to avoid unpleasant odors and to reduce the expense of the rubbers. When the proportion of acrylonitrile exceeds 40% however, the rubber becomes undesirably tough and difficult to handle. Even more important, at this level of acrylonitrile, the rubber begins to be strongly attacked by or even becomes soluble in aromatic solvents and ketones.

The major proportion of the composition of the new polymers is made up of butadiene and styrene, which are present both in the completely finished copolymer latex and in the added monomers.

The general physical properties of the new polymers, as for example their ability to form coherent films, their tensile strength and Mooney viscosity, are largely determined by the composition, properties and amount of the copolymer latex used. While the composition of the copolymer in the latex may vary within rather wide ranges, it is nevertheless necessary that it contain both butadiene and styrene. I have found that when latices containing only butadiene are used as the base latices in the process of my invention, the resulting polymers are so soft and weak that they are valueless for the coating, impregnating and container sealing fields as well as being deficient in solvent- and oil-resistance. At least about 10% of the copolymer in the finished latex must be styrene in order that the desired properties may be obtained in the new polymers of my invention. Likewise, polymers containing only styrene are not suitable for use in my invention, since the finished polymer in this case will be seriously lacking in the ability to form coherent films. At least about 10% of butadiene must be added to the styrene in order to impart the necessary rubbery, film-forming characteristics to the polymer. The base latices which may be used in the process of my invention, therefore, are those containing from 90% to 10% of butadiene and from 10% to 90% of styrene. For best results, I prefer to use latices containing between about 70% and about 15% butadiene, and between about 30% and about 85% styrene.

I have found, furthermore, that certain proportions of base latex to the added monomers must be maintained in order to achieve the purposes of my invention. When the monomeric mixture is polymerized in the complete absence of base latex, the resulting polymer does not have the solvent- and oil-resistance of the polymers of my invention, as shown by Example IV, above. In this case, no grafting can take place because there is no base polymer to which the growing polymer chains can become attached. I have found that at least about 15 parts by weight of polymer solids in the form of finished latex must be used for every 100 parts of monomer mixture. Below this proportion of base latex, too few active sites for grafting are presented, and the percentage of simple copolymers and homopolymers is very high. As a result, the solvent-resistance of the polymer is poor. I have found, also, that the proportion of base polymer to monomers may be increased to as much as 100 parts of base polymer solids to 100 parts of mixed monomers. Above this figure, the proportion of polymer chains grafted to the backbone polymer is so low that the base polymer is insufficiently protected from the attack of solvent, and the solvent-resistance of the polymer is poor.

The percentage of butadiene and styrene in the polymer as a whole are also important. As I have indicated before, these well-known constituents of synthetic rubber contribute largely to the general physical characteristics of the polymers. I have found that at least about 30% of the composition of the polymer must be butadiene, in order to impart the necessary ability to form rubbery, coherent films. The butadiene must be modified, however, with both styrene and acrylonitrile in order to obtain strength, hardness and solvent-resistance. I have found that the largest proportion of butadiene which can be present in the polymers is about 80%. When this proportion is exceeded, the resultant polymers are soft, weak and subject to attack by solvents. Conversely, the amount of styrene in the polymer must be controlled, at least about 10% of styrene being necessary for the strength and hardness of the polymer. However, the amount of styrene in the polymer must not exceed about 60%, since above this proportion the latices dry down to a powdery crumb. No coherent film can be formed from such latices.

The following examples illustrate a number of different ways in which my invention may be carried out.

EXAMPLE V

An aqueous phase was made by dissolving 3 parts of the sodium salt of disproportionated rosin acid, 2 parts of the sodium salt of the condensation product of naphthalene sulfonic acid with formaldehyde, 0.1 part of sodium hydroxide and 0.5 part of potassium persulfate in 205 parts of water. This solution, together with 52.6 parts of a completely finished latex of a 15% 1,3-butadiene-85% styrene copolymer (38% solids) and 0.7 part of a 28% solution of ammonium hydroxide, were then sucked into an evacuated container, and enough butadiene was admitted to the container to bring the pressure to five pounds gauge. Stirring of the mixture was begun and the temperature was raised to 50° C. A mixture of monomers containing 60 parts of 1,3-butadiene, 20 parts of styrene, 20 parts of acrylonitrile and 0.35 part of tertiary dodecyl mercaptan was added to the reactor. On completion of the monomer addition, the reaction mixture became exothermic, and the temperature was held at about 50° C. by means of outside cooling. Reaction was continued for about seven hours, i.e. until conversion had reached about 94%, at which time the reaction was stopped by the addition of 0.12 part of hydroquinone in ammoniacal solution. The batch was then steam stripped to remove unreacted monomers.

The composition of the polymer made according to the above procedure was as follows: butadiene 52.5%, styrene 31%, acrylonitrile 16.5%. The polymer was found to have excellent solvent- and oil-resistance, and to have a Mooney viscosity of 144 at 212° F. Its film-forming characteristics, tensile strength, and generally outstanding physical properties made it a most useful polymer.

EXAMPLE VI

The procedure of Example V was followed except that 31.8 parts of a completely finished latex of a 70% butadiene-30% styrene copolymer (64% solids) were used as the base latex, and that 0.5 part of the mercaptan modifier were used. The composition of the resulting polymer was: butadiene 61.5%, styrene 22%, acrylonitrile 16.5%. The polymer was softer than that of Example V, having a Mooney viscosity of 70 at 212° F., and had a high degree of resistance to solvents and oils.

EXAMPLE VII

The procedure of Example V was followed except that 47.6 parts of a completely finished latex of a 50% butadiene-50% styrene copolymer (42% solids) were used as the base latex and that the tertiary dodecyl mercaptan was added to the aqueous phase before addition of the monomers. The composition of the resulting polymer was as follows: butadiene 58.5%, styrene 25%, acrylonitrile 16.5%. The polymer had a Mooney viscosity of 68, and exhibited excellent oil- and solvent-resistance.

EXAMPLES VIII AND IX

The procedure of Example V was followed except that slightly larger amounts of mercaptan modifier, 0.41 and 0.375 were used, and the reactions were run to about 92% conversion. The resulting polymers had the following composition: butadiene 52.5%, styrene 31%, acrylonitrile 16.5%. Their Mooney viscosities were 92 at 212° F. and their oil- and solvent-resistance were excellent.

EXAMPLE X

The procedure of Example VI was followed, using the 70% butadiene-30% styrene base polymer of that example. The monomeric mixture contained 60 parts of butadiene, 20 parts of styrene and 20 parts of methacrylonitrile. The composition of the polymer was: butadiene 61.5%, styrene 22% and methacrylonitrile 16.5%. The solvent- and oil-resistance of the polymer was very high and it had the added advantage of the greater flexibility imparted by the use of the methyl-substituted acrylonitrile.

EXAMPLE XI

The aqueous phase of Example I was used except that only 0.375 part of tertiary dodecyl mercaptan was added. The aqueous phase was mixed with 52.6 parts of a completely finished latex of a 15% 1,3-butadiene-85% styrene copolymer (38% solids) and 0.7 part of a 28% solution of ammonium hydroxide. The mixture was stirred together at room temperature for about one hour and then transferred to an evacuated polymerization reactor. A mixture of 60 parts of 1,3-butadiene, 20 parts of styrene and 20 parts of acrylonitrile was added to the reactor, and the contents heated to 50° C. The temperature was maintained at 50° C. for about five hours, i.e. until polymerization was about 91% complete. The composition of the resulting polymer was: butadiene 52.5%, styrene 31%, acrylonitrile 16.5%. The polymer had a Mooney viscosity of 172 and exhibited excellent solvent- and oil-resistance as well as good film-forming properties.

EAMPLE XII

The procedure of Example XI was followed except that the monomeric mixture contained 40 parts of butadiene, 20 parts of styrene and 40 parts of acrylonitrile and that 0.25 part of the mercaptan modifier were used. The composition of the resulting polymer was: butadiene 36%, styrene 31%, acrylonitrile 33%. The polymer was found to have a very high degree of oil- and solvent-resistance, and to have a Mooney viscosity of about 200 at 212° F.

EXAMPLE XIII

The procedure of Example XI was followed except that the mixture of monomers contained 40 parts of butadiene, 40 parts of styrene and 20 parts of acrylonitrile. The composition of the resulting polymer was: butadiene 36%, styrene 47%, acrylonitrile 17%. The polymer was found to have excellent solvent resistance and to have a Mooney viscosity of 120 at 212° F.

EXAMPLE XIV

The procedure of Example XI was followed except that the mixture of monomers contained 60 parts of butadiene, 25 parts of styrene and 15 parts of acrylonitrile. The composition of the resulting polymer was: butadiene 52.5%, styrene 35%, acrylonitrile 12.5%. The resulting polymer was found to have good solvent-resistance and generally satisfactory properties.

The grafted terpolymers made according to the process of my invention may be used in the form of water dispersions or latices, with or without the addition of compounding ingredients, or the latices may be coagulated to produce useful solid polymers. The latices have proved to be very useful in the coating and impregnating fields, but have found particular usefulness in the manufacture of container sealing gaskets to be used with oily foodstuffs or with organic solvents of many types.

While I have shown only 1,3-butadiene, styrene and acrylonitrile as ingredients of the new polymers, I wish it to be understood that my invention is not limited to these particular constituents. Any conjugated diolefinic monomer may be substituted for the butadiene, either in the finished copolymer latex or in the added monomers. For example, in place of 1,3-butadiene, I may use isoprene, 2,3-dimethyl butadiene, piperylene, 2-chloro-1,3-butadiene and the like. Styrene likewise, may be replaced by alpha-methyl styrene, p-methoxy styrene, 3-methyl styrene, p-divinyl benzene and the like. The acrylonitrile may be replaced by any vinyl monomer containing a cyano group, as for example methacrylonitrile, maleonitrile, fumaronitrile and chlorfumaronitrile.

The polymer compositions in the examples and claims are the theoretical compositions based on the amounts of ingredients used in the polymerization reaction. Analysis of representative polymers has demonstrated that the actual compositions are in fact very close to the theoretical.

I claim:

1. A process for making a solvent-resistant copolymer which comprises forming an aqueous phase composed of a water solution of an emulsifying agent; adding to said aqueous phase from about 15 to 100 parts by weight of a 90 to 10% butadiene- 10 to 90% styrene copolymer in the form of a completely finished latex, said latex being substantially devoid of free monomers and catalyst, a water soluble peroxygen catalyst, and about 100 parts by weight of a monomer composition of butadiene, styrene and acrylonitrile; and maintaining the resulting mixture at polymerization temperature until polymerization of the added monomer composition has proceeded to from 90 to 100% of complete conversion; the added monomer composition being adjusted to produce an emulsion copolymerizate of about 10 to 25% by weight of acrylonitrile, about 10 to 60% by weight of styrene, and about 30 to 80% by weight of butadiene.

2. The process of claim 1 wherein 20 parts by weight of the butadiene-styrene copolymer per 100 parts by weight of the monomer composition is used.

3. The process of claim 1 wherein the emulsifying agent is present in the aqueous phase in an amount of about 12 to 25 parts by weight per 10 parts by weight of the butadiene-styrene copolymer latex.

4. The process of claim 3 wherein said latex is a 15% butadiene- 85% styrene copolymer latex.

5. The process of claim 3 wherein said latex is a 70% butadiene- 30% styrene copolymer latex.

6. The process of claim 3 wherein the monomer composition is comprised of 60 parts by weight of butadiene, 20 parts by weight of styrene and 20 parts by weight of acrylonitrile.

7. The process of claim 3 wherein the catalyst is added to the aqueous phase prior to the addition of the butadiene-styrene copolymer latex.

8. The process of claim 7 wherein the mixture of aqueous phase, catalyst and butadiene-styrene copolymer latex is raised to polymerization temperature prior to the addition of the monomer composition.

9. The polymer made according to the process of claim 1.

10. A process for making a solvent-resistant copolymer which comprises forming an aqueous phase composed of 3 parts by weight of the sodium salt of disproportionated rosin acid, 2 parts by weight of the sodium salt of the condensation product of naphthalene sulfonic acid with formaldehyde and 0.5 part by weight of potassium persulfate dissolved in 205 parts by weight of water; adding to said aqueous phase 52.6 parts by weight of a completely finished 38% solids 15% butadiene-85% styrene copolymer latex; said latex being substantially devoid of free monomers and catalyst, charging the mixture to an evacuated container; adding butadiene to said container until the pressure therein is substantially equal to atmospheric pressure; raising the temperature of the mixture to 50° C.; charging to the container a monomer composition of 60 parts by weight of butadiene, 20 parts by weight of styrene and 20 parts by weight of acrylonitrile, together with 0.35 part by weight of tertiary dodecyl mercaptan; maintaining the temperature of the thus formed reaction mixture at 50° C. until polymerization of the added monomer composition is about 94% complete; adding 0.12 part by weight of hydroquinone to the reaction mixture in order to stop polymerization; and thereafter stripping the unreacted monomers from the resultant polymer emulsion.

11. The polymer made according to the process of claim 10.

References Cited by the Examiner

UNITED STATES PATENTS

| | | | |
|---|---|---|---|
| 2,623,032 | 12/1952 | Banes et al. | 260—879 |
| 2,820,773 | 1/1958 | Childers et al. | 260—880 |
| 3,010,936 | 11/1961 | Irvin | 260—880 |

FOREIGN PATENTS

| | | |
|---|---|---|
| 649,166 | 1/1951 | Great Britain. |

MURRAY TILLMAN, *Primary Examiner.*